US009139886B2

(12) United States Patent
Sakai et al.

(10) Patent No.: US 9,139,886 B2
(45) Date of Patent: Sep. 22, 2015

(54) GRAIN-ORIENTED ELECTRICAL STEEL SHEET AND METHOD FOR PRODUCING SAME

(75) Inventors: Tatsuhiko Sakai, Tokyo (JP); Hideyuki Hamamura, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 13/637,587

(22) PCT Filed: Mar. 29, 2011

(86) PCT No.: PCT/JP2011/057883

§ 371 (c)(1),
(2), (4) Date: Sep. 26, 2012

(87) PCT Pub. No.: WO2011/125672

PCT Pub. Date: Oct. 13, 2011

(65) Prior Publication Data

US 2013/0017408 A1    Jan. 17, 2013

(30) Foreign Application Priority Data

Apr. 1, 2010    (JP) .................. 2010-085457

(51) Int. Cl.
*B23K 26/38*    (2014.01)
*C21D 8/12*     (2006.01)
(Continued)

(52) U.S. Cl.
CPC .......... *C21D 8/1294* (2013.01); *B23K 26/0009* (2013.01); *B23K 26/0051* (2013.01);
(Continued)

(58) Field of Classification Search
CPC ..................................... H01F 1/14; H01F 1/16
USPC ........................... 148/110, 111, 112, 113, 120
See application file for complete search history.

(56) References Cited

U.S. PATENT DOCUMENTS

| 4,456,812 A | 6/1984 | Neiheisel et al. |
| 6,666,929 B1 | 12/2003 | Ban |

(Continued)

FOREIGN PATENT DOCUMENTS

| JP | 58-26406 B2 | 6/1983 |
| JP | 62-53579 B2 | 11/1987 |

(Continued)

OTHER PUBLICATIONS

Machine translation of JP 2002292484A, Oct. 2002.*

(Continued)

*Primary Examiner* — Jie Yang
(74) *Attorney, Agent, or Firm* — Birch, Stewart, Kolasch & Birch, LLP

(57) ABSTRACT

In a method for producing a grain-oriented electrical steel sheet, grooves each having a given length and extending in a direction including a direction perpendicular to a transportation direction of the grain-oriented electrical steel sheet are formed at given intervals in the transportation direction by irradiating the surface of the grain-oriented electrical steel sheet with a laser beam while scanning the surface of the grain-oriented electrical steel sheet with the laser beam. Further, in the method for manufacturing a grain-oriented electrical steel sheet, the laser beam is a continuous-wave laser beam having a laser wavelength $\lambda$ of 1.0 μm to 2.1 μm, power density Pd [W/mm$^2$] which is obtained by dividing laser beam intensity P by a focused beam area S is $5\times10^5$ W/mm$^2$ or more, and the power density Pd [W/mm$^2$] and scanning speed V [mm/s] of a focused spot of the laser beam on the surface of the grain-oriented electrical steel sheet satisfy a relationship of $0.005\times Pd+3000 \leq V \leq 0.005\times Pd+40000$.

12 Claims, 8 Drawing Sheets

(51) Int. Cl.
 B23K 26/00 (2014.01)
 B23K 26/36 (2014.01)
 B23K 26/40 (2014.01)

(52) U.S. Cl.
 CPC ........... B23K26/0081 (2013.01); B23K 26/367 (2013.01); B23K 26/4005 (2013.01); *C21D 2201/05* (2013.01); *Y10T 428/12389* (2015.01)

(56) References Cited

U.S. PATENT DOCUMENTS

| | | | |
|---|---|---|---|
| 7,442,260 B2 * | 10/2008 | Sakai et al. | 148/111 |
| 2006/0169362 A1 | 8/2006 | Sakai et al. | |

FOREIGN PATENT DOCUMENTS

| | | |
|---|---|---|
| JP | 62-54873 B2 | 11/1987 |
| JP | 6-57335 A | 3/1994 |
| JP | 07-320921 | 12/1995 |
| JP | 10-183251 A | 7/1998 |
| JP | 2002-292484 A | 10/2002 |
| JP | 2003-129135 A | 5/2003 |
| JP | 2007-119821 A | 5/2007 |
| JP | 2007-277644 A | 10/2007 |
| RU | 2 238 340 C2 | 10/2004 |
| RU | 2 301 839 C2 | 6/2007 |
| RU | 2 358 346 C1 | 6/2009 |
| SU | 1744128 A1 | 6/1992 |
| WO | WO 2004/083465 A1 | 9/2004 |
| WO | WO 2006/120985 A1 | 11/2006 |
| WO | WO 2009/104521 A1 | 8/2009 |

OTHER PUBLICATIONS

International Search Report for PCT/JP2011/057883 dated Jul. 5, 2011.
Japanese Notice of Reasons for Rejection dated Dec. 4, 2012 issued in Japanese Patent Application No. 2012-509491 (English translation is provided).
Russian Notice of Allowance, dated Oct. 7, 2013, for Russian Application No. 2012141317/02.
Extended European Search Report for EP 11765572.0 dated Apr. 23, 2014.

\* cited by examiner

50 μm

50 μm

GRAIN-ORIENTED ELECTRICAL STEEL SHEET AND METHOD FOR PRODUCING SAME

FIELD OF THE INVENTION

The present invention relates to a grain-oriented electrical steel sheet which is used in an iron core material or the like of a winding transformer, and a method for producing the grain-oriented electrical steel sheet. In particular, the present invention relates to a grain-oriented electrical steel sheet in which iron loss is reduced by forming grooves in the surface thereof by laser beam machining, and a method for manufacturing the grain-oriented electrical steel sheet.

Priority is claimed on Japanese Patent Application No. 2010-85457 filed Apr. 1, 2010, the contents of which are incorporated herein by reference.

DESCRIPTION OF RELATED ART

A grain-oriented electrical steel sheet is an electrical steel sheet which contains Si and in which a magnetization easy axis (a cubic crystal (100) <001>) of a crystal grain thereof is approximately aligned with a rolling direction in a manufacturing process thereof. This grain-oriented electrical steel sheet has a structure in which a plurality of magnetic domains in which magnetization is directed in the rolling direction are arranged with a domain wall interposed therebetween, and many of these domain walls are 180° domain walls. The magnetic domain of this grain-oriented electrical steel sheet is called a 180° magnetic domain and the grain-oriented electrical steel sheet is easily magnetized in the rolling direction. For this reason, in a certain relatively small magnetizing force, magnetic flux density is high and iron loss is low. Therefore, the grain-oriented electrical steel sheet is very excellent as an iron core material of a transformer. As a parameter of the iron loss, generally, W17/50 [W/kg] is used. W17/50 is a value of iron loss which is generated in a grain-oriented electrical steel sheet when alternating-current excitation is performed such that the maximum magnetic flux density becomes 1.7 T at a frequency of 50 Hz. If the W17/50 is reduced, a more efficient transformer can be manufactured.

A normal method for producing a grain-oriented electrical steel sheet will be schematically described below. A hot-rolled silicon steel sheet (a hot-rolled sheet) containing a given amount of Si is adjusted to a desired sheet thickness by annealing and cold rolling. Next, the silicon steel sheet is annealed in a continuous annealing furnace, whereby a primary recrystallization (grain size: 20 μm to 30 μm) together with decarburization and stress relief is performed. Subsequently, an annealing separator containing MgO as a main chemical component is applied to the surface of the silicon steel sheet (hereinafter sometimes simply referred to as a steel sheet), the steel sheet is coiled into a coil shape (an outer shape is a cylindrical shape), batch annealing of about 20 hours is performed at high temperature of about 1200° C., thereby forming a secondary recrystallization texture in the steel sheet, and a glass film is formed on the surface of the steel sheet.

At that time, since an inhibitor such as MnS or AlN, for example, is contained in the steel sheet, a so-called Goss grain in which a rolling direction and a magnetization easy axis conform to each other is preferentially subjected to crystal growth. As a result, a grain-oriented electrical steel sheet having a high crystal orientation (orientation) after secondary recrystallization annealing is obtained. After secondary recrystallization annealing, the coil is uncoiled, and the steel sheet is continuously transported into a separate annealing furnace, whereby flattening annealing is performed, thereby eliminating unnecessary strain in the steel sheet. In addition, coating to impart tension and electric insulation to the surface of the steel sheet is performed, so that a grain-oriented electrical steel sheet is manufactured.

In the grain-oriented electrical steel sheet manufactured through such a process, even if an additional treatment is not carried out, the iron loss is low. However, if strain approximately perpendicular to a rolling direction (a transportation direction) and having a constant period (a regular interval) is imparted, the iron loss is further reduced. In this case, a 90° magnetic domain in which the rolling direction and magnetization are orthogonal to each other is formed by local strain and a domain wall interval of an approximately rectangular 180° magnetic domain becomes narrow (the width of a 180° magnetic domain becomes small) with magnetostatic energy of the 90° magnetic domain as a source. Since the iron loss (W17/50) has a positive correlation with the interval between the 180° domain walls, the iron loss is reduced based on this principle.

For example, as disclosed in Patent Citation 1, a method of imparting strain to a steel sheet by laser irradiation has already been put to practical use. Similarly, if a groove having a depth in a range of 10 μm to 30 μm is formed approximately perpendicular to a rolling direction of a grain-oriented electrical steel sheet and at a constant period, the iron loss is reduced. This is because a magnetic pole is generated in the periphery of the groove due to a change in permeability in a void of the groove and the interval between the 180° domain walls becomes narrow with the magnetic pole as a source, so that the iron loss is improved. As a method of forming a groove, there is a method of forming a groove in a cold rolled sheet using electrolytic etching, as disclosed in Patent Citation 2, a method of mechanically pressing a die having a tooth shape to a cold rolled sheet, as disclosed in Patent Citation 3, or a method of melting and evaporating a steel sheet (a laser-irradiated portion) by laser irradiation, as disclosed in Patent Citation 4.

Incidentally, power transformers are roughly divided into laminated transformers and winding transformers. Laminated transformers are manufactured by laminating and fixing a plurality of electrical steel sheets. On the other hand, in a manufacturing process of winding transformers, since a grain-oriented electrical steel sheet is coiled by performing lamination while coiling it, an annealing process to release deformation strain (for example, strain due to bending) thereof is included. Therefore, a grain-oriented electrical steel sheet manufactured by the above-described method of imparting strain in order to improve the iron loss can be used in the laminated transformer while maintaining an iron loss reduction effect. However, it is not possible to use the grain-oriented electrical steel sheet in the winding transformer while maintaining an iron loss reduction effect. That is, in the winding transformer, since strain disappears due to strain relief annealing, the iron loss reduction effect also disappears. On the other hand, a grain-oriented electrical steel sheet manufactured by the method of forming a groove in order to improve the iron loss has the advantage that the grain-oriented electrical steel sheet can be used in both the laminated transformer and the winding transformer, because even if the strain relief annealing is performed, the effect of improving the iron loss is not reduced.

Here, the conventional technique of a method of forming a groove will be described. In the method using electrolytic etching, a steel sheet in which a glass film is formed on the surface after, for example, secondary recrystallization is used, the glass film on the surface is linearly removed by a laser or a mechanical method, and a groove is formed in a portion where a matrix is exposed by etching. In this method, the process is complicated, so that the manufacturing cost increases and there is a limit to treatment speed.

In the method of mechanically pressing a die having a tooth shape, since an electrical steel sheet is a very hard steel sheet containing about 3% of Si, wear and damage of the die easily occur. If the die is worn away, since variation occurs in the depth of the groove, the iron loss reduction effect becomes non-uniform.

In the method using laser irradiation (referred to as a laser method), there is an advantage that high-speed groove machining can be performed by a focused laser beam having high power density. Further, since the laser method is non-contact machining, it is possible to stably perform uniform groove machining by control of laser power or the like. Various attempts have been made in the past with respect to the laser method, in order to efficiently form a groove having a depth of 10 μm or more in the surface of a steel sheet. For example, in Patent Citation 4, there is disclosed a method of forming a groove by realizing high power density (energy density at a focal point) of $2 \times 10^5$ W/mm$^2$ or more using a pulsed $CO_2$ laser (wavelength: 9 μm to 11 μm) having high peak power. Here, in the method using the pulsed $CO_2$ laser, since a laser stop time is present between successive pulses, in a case of scanning the surface of a steel sheet with a laser beam at high speed, holes (a row of points) which are formed by the pulses are connected to each other, so that a groove is formed on a scanning line of a laser beam. At this time, in a case where a time interval between the pulses is long in high-speed beam scanning, the interval between the rows of points widens, so that the holes are separated from each other, whereby an iron loss reduction effect decreases sharply. An industrially utilizable maximum pulse frequency is 100 kHz at most, and in this case, a pulse time interval is 10 μs. For example, at a scanning speed of 30 m/s which is required for high-speed processing, a scanning position of a beam moves 300 μm during a time interval between the pulses. In order for the points of the row of points to be in minimum contact with each other spatially, it is necessary that the diameter of a focused beam is 300 μm or more. For this reason, in order to obtain sufficient power density for the machining, there is a need to make laser power large, so that there is a technical limit to the laser device. In Patent Citation 5, a technique is disclosed in which an efficient groove is formed at low power density by using a continuous-wave laser and changing the shape of a focused laser beam from a circular shape to an elliptical shape.

Further, in the past, a $CO_2$ laser in which relatively high power is easily obtained has been used as a laser light source. The wavelength of the $CO_2$ laser is in a band of 9 to 11 μm and laser light having this wavelength is greatly absorbed by metal vapor or plasma which is generated at a machining point (a machining position). For this reason, the power of the laser light reaching the surface of a steel sheet is reduced, so that machining efficiency is reduced. Further, since the plasma or the metal vapor heated and expanded by absorbing the laser light acts as a secondary heat source, thereby melting the periphery of an edge portion (a shoulder portion) of a groove, an amount of melt increases, so that the shape (for example, increase of a projection derived from melt (described later)) of the groove becomes worse.

PATENT CITATION

[Patent Citation 1] Japanese Examined Patent Application, Second Publication No. S58-26406

[Patent Citation 2] Japanese Examined Patent Application, Second Publication No. S62-54873

[Patent Citation 3] Japanese Examined Patent Application, Second Publication No. S62-53579

[Patent Citation 4] Japanese Unexamined Patent Application, First Publication No. H6-57335

[Patent Citation 5] Japanese Unexamined Patent Application, First Publication No. 2003-129135

SUMMARY OF THE INVENTION

Problems to be Solved by the Invention

In formation of a groove by laser beam irradiation in the conventional techniques described above, a laser beam is absorbed at the surface of a steel sheet, so that the metal (matrix) of the steel sheet is melted, whereby fine melt droplets scatter or the matrix of the surface of the steel sheet heated to a boiling point evaporates, so that a groove is formed. Melts on the surface of the steel sheet scatter due to the pressure of high-temperature metal vapor or plasma at a machining point (a laser beam irradiation point). In a case where a large amount of the melt is formed, or a case where the pressure is small, the melt cannot scatter fully and is stuck to a peripheral portion of the formed groove, so that a surface projection is formed, as illustrated in FIG. 6.

Since the grain-oriented electrical steel sheets are laminated and compressed when shaping a transformer, if the surface projection becomes significantly large, electric insulation between the matrixes of the grain-oriented electrical steel sheets of the layers is reduced. Further, if the surface projection is compressed, since strain deformation occurs in the steel sheet, a problem in which the iron loss deteriorates arises. In the conventional techniques described above, although it is possible to deeply and efficiently form a groove, there is a problem in which it is difficult to sufficiently reduce the surface projection.

The present invention has been made in view of the above-mentioned points and provides a grain-oriented electrical steel sheet in which even if the grain-oriented electrical steel sheets are laminated and compressed as an iron core material of a winding transformer, a decrease in electric insulation between layers and an increase in strain are suppressed, so that the grain-oriented electrical steel sheet has excellent energy efficiency (that is, low iron loss, hereinafter referred to as an iron loss characteristics). Further, the present invention provides a method for producing a grain-oriented electrical steel sheet, in which when forming a groove in a grain-oriented electrical steel sheet which is used as an iron core material or the like of a winding transformer, by irradiating the surface of the steel sheet with a laser beam, the size of a surface projection which is formed at a peripheral portion of the groove is reduced as much as possible, and which is suitable for a high-speed production line.

Methods for Solving the Problem

The overview of the invention is as follows.

(1) A method for producing a grain-oriented electrical steel sheet according to an aspect of the present invention includes forming grooves each having a given length and extending in a direction intersecting a transportation direction of the grain-oriented electrical steel sheet, at given intervals in the transportation direction by irradiating the surface of the grain-oriented electrical steel sheet with a laser beam while scanning the surface of the grain-oriented electrical steel sheet with the laser beam. In the method for producing a grain-oriented electrical steel sheet, the laser beam is a continuous-wave laser beam having a laser wavelength $\lambda$ of 1.0 µm to 2.1 µm, power density Pd [W/mm$^2$] which is obtained by dividing laser beam intensity P by a focused beam area S is $5 \times 10^5$ W/mm$^2$ or more, and the power density Pd [W/mm$^2$] and scanning speed V [mm/s] of a focused spot of the laser beam on the surface of the grain-oriented electrical steel sheet satisfy a relationship of $0.005 \times Pd + 3000 \leq V \leq 0.005 \times Pd + 40000$.

(2) In the method for producing a grain-oriented electrical steel sheet according to the above (1), the laser beam may be fiber laser light or thin disk type solid-state laser light including a YAG laser.

(3) In the method for producing a grain-oriented electrical steel sheet according to the above (1) or (2), the power density Pd [W/mm$^2$] and the scanning speed V [mm/s] may satisfy a relationship of $0.005 \times Pd + 4050 \leq V \leq 0.005 \times Pd + 40000$.

(4) In the method for producing a grain-oriented electrical steel sheet according to the above (1) or (2), the power density Pd [W/mm$^2$] and the scanning speed V [mm/s] may satisfy a relationship of $0.005 \times Pd + 11070 \leq V \leq 0.005 \times Pd + 30700$.

(5) In the method for producing a grain-oriented electrical steel sheet according to the above (1) or (2), the diameter d of the focused spot may be 0.10 mm or less.

(6) A grain-oriented electrical steel sheet according to another aspect of the present invention includes grooves each having a given length, extending in a direction intersecting a transportation direction, and being formed at given intervals in the transportation direction by a laser beam. The grain-oriented electrical steel sheet includes a solidified layer provided on an interface with the groove, wherein the depth of the groove is in a range of 8 µm to 30 µm, and the cross-sectional area of the groove is less than 1800 µm$^2$.

(7) The grain-oriented electrical steel sheet according to the above (6), the depth of the groove may be in a range of 10 µm to 30 µm.

(8) In the grain-oriented electrical steel sheet according to the above (6) or (7), the cross-sectional area of the groove may be less than 1000 µm$^2$.

(9) In the grain-oriented electrical steel sheet according to the above (6) or (7), the cross-sectional area of the groove may be less than 600 µm$^2$.

Effects of the Invention

In the grain-oriented electrical steel sheet according to the present invention, since the height of a projection of a peripheral portion of the groove is reduced to 5 µm or less, even if the grain-oriented electrical steel sheets are laminated and compressed as an iron core material of a winding transformer, a decrease in electric insulation between layers and an increase in strain due to deformation are suppressed, so that the grain-oriented electrical steel sheet has excellent iron loss characteristics. Further, according to the method for producing a grain-oriented electrical steel sheet related to the invention, it is possible to establish a manufacturing process which can respond to the speed of a high-speed line due to high-speed beam scanning and is high in productivity.

DETAILED DESCRIPTION OF THE INVENTION

Hereinafter, preferred embodiments of the present invention will be described with reference to the accompanying drawings.

The inventors have intensively studied on a mechanism in which a surface projection (a projection or a projection derived from melt) of a grain-oriented electrical steel sheet is formed at the time of laser beam irradiation. As described above, a laser beam is absorbed at the surface of a steel sheet by laser beam irradiation, whereby a matrix of the steel sheet is melted, so that fine melt droplets scatter. The melts scatter due to the pressure of high-temperature metal vapor or plasma at a machining point (a laser beam irradiation point). In the past, in order to form a groove in a grain-oriented electrical steel sheet, a $CO_2$ laser in which relatively high power is easily obtained has been used. By performing an experiment to form a groove in a grain-oriented electrical steel sheet using the $CO_2$ laser as a light source and studying in detail melting phenomena, a surface projection was estimated to be formed by the following mechanism.

That is, the wavelength of the $CO_2$ laser is in a band of 9 to 11 µm and laser light having this wavelength is greatly absorbed by metal vapor or plasma which is generated at a machining point. For this reason, the power of the laser light reaching the surface of the steel sheet is reduced, so that machining efficiency is reduced. Further, since the plasma or the metal vapor heated and expanded by absorbing the laser light acts as a secondary heat source, thereby melting the periphery of an edge portion of a groove, the amount of melt increases. It is considered that a large projection derived from melt is formed due to a decrease in the power of the laser light reaching the surface and an increase in the amount of melt.

Therefore, an experiment to irradiate a steel sheet with a laser beam emitted from a laser light source having a high light-focusing property at a wavelength in a range of 1.0 µm to 2.1 µm, that is, a laser light source such as a fiber laser or a thin disk type YAG laser has been performed and irradiation conditions have been studied in detail. As a result, as described below, it was found that a grain-oriented electrical steel sheet in which iron loss is small and the size of a surface projection is reduced can be manufactured.

Figure 5:
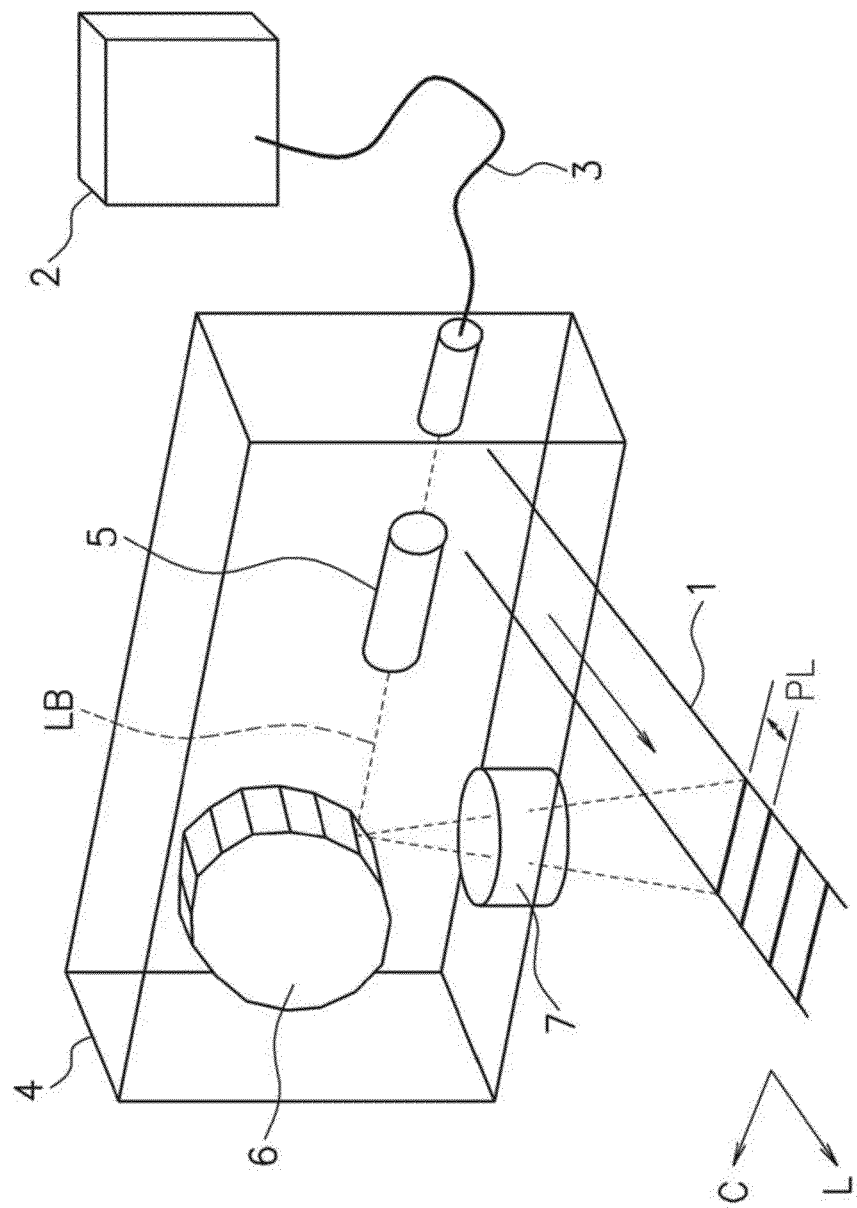
FIG. 5 is a schematic diagram showing an example of a manufacturing apparatus which is used in an embodiment.

First, an embodiment of a method for manufacturing a grain-oriented electrical steel sheet according to the present invention will be described in detail using the drawings. FIG. 5 is a schematic diagram showing an example of a manufacturing apparatus which is provided with a laser light source and a laser beam irradiation device that are used in this embodiment. In addition, in FIG. 5, an irradiation position of laser light which is irradiated to a grain-oriented electrical steel sheet (a steel sheet) 1 is also shown. An example in which a fiber laser doped with Yb as a laser medium is used as a laser light source is described. In FIG. 5, the steel sheet 1 is a grain-oriented electrical steel sheet with a sheet width of 150 mm after secondary recrystallization and a glass film is formed on the surface of a matrix. The steel sheet 1 is transported at a constant rate in a line direction (a rolling direction or a transportation direction) L at a line speed VL.

A laser device 2 is a commercially available fiber laser having a maximum power of 2000 W and has a fiber core doped with Yb as a laser medium, and the oscillation wavelength thereof is in a range of 1.07 µm to 1.08 µm. The diameter of the core is about 15 µm and a laser oscillation mode of an output beam is approximately a fundamental Gaussian mode. Continuous-wave (CW) laser light output from the laser device 2 is transmitted through an optical fiber 3 and reaches a laser irradiation device 4. The laser irradiation device 4 includes a collimator 5, an icosahedral rotating polygon mirror 6, and an fθ lens 7 having a focal length of 200 mm. The collimator 5 adjusts the diameter of a laser beam LB output from the transmission fiber 3. Further, the rotating polygon mirror 6 deflects the laser beam LB, thereby scanning the steel sheet 1 with the laser beam LB at a high speed approximately in a sheet width direction C, and the fθ lens 7 focuses the laser beam LB.

Beam scanning speed V on the steel sheet 1 is adjusted in a range of 2 m/s to 50 m/s by regulating the rotating speed of the rotating polygon mirror 6. The scanning width in the sheet width direction of the focused beam on the steel sheet 1 is about 150 mm. A diameter (a diameter in which 86% of energy is included) d of the focused beam is adjusted to be in a range of 10 µm to 100 µm by a change in output beam diameter using the collimator 5. In addition, a focus mechanism (not shown) is disposed between the rotating polygon mirror 6 and the fθ lens 7 having a focal length of 200 mm, and the distance between the fθ lens 7 and the steel sheet can be adjusted by the focus mechanism. The steel sheet 1 is scanned with the laser beam by one face of the rotating polygon mirror 6 which rotates, so that a single groove having a given length (for example, the entire length in the sheet width direction) is formed in the steel sheet 1 approximately in a width direction. The distance between the grooves adjacent to each other in the L direction, that is, an irradiation pitch PL in the rolling direction (the transportation direction) can be changed by adjustment of the line speed VL and polygon rotating speed. In this manner, by irradiating the steel sheet 1 with the laser beam LB using the laser irradiation device 4, grooves are formed at constant scanning intervals PL (the scanning interval corresponds to an irradiation pitch or a groove interval) in the rolling direction L. That is, by irradiating the surface of the grain-oriented electrical steel sheet with the laser beam while focusing the laser beam on the surface of the grain-oriented electrical steel sheet and then scanning the surface of the grain-oriented electrical steel sheet with the laser beam, grooves each having a given length and extending in a direction approximately perpendicular to the transportation direction of the grain-oriented electrical steel sheet (a direction intersecting the transportation direction, or a direction including a vector perpendicular to the transportation direction, for example, within a range of ±45° from the perpendicular direction) are formed at given intervals in the transportation direction.

On the steel sheet 1 after the laser beam irradiation, strain relief annealing at about 800° C. is carried out in an annealing furnace (not shown) and an insulating coating is then carried out by a coating device (not shown) in order to impart electric insulation and tension to the surface. In addition, the thickness of the insulating coating is in a range of 2 µm to 3 µm.

<Relationship Between Groove Depth and Iron Loss Reduction Effect>

First of all, the relationship between groove depth and the iron loss reduction effect was examined. As a material, a grain-oriented electrical steel sheets having B8 of 1.90 T were prepared. Here, B8 is defined by magnetic flux density [T] which is generated at a magnetizing force H of 0.8 A/m. In particular, in the case of a grain-oriented electrical steel sheet, B8 is magnetic flux density when the steel sheet has been magnetized in the rolling direction. The higher the B8, the higher the crystal orientation of the steel sheet 1 (the larger the orientation), and in general, iron loss is also low. Using these materials, grooves were formed in the surface of the steel sheet by performing laser beam irradiation in laser beam irradiation conditions in which laser beam intensity P is 1000 W, the diameter d of the focused beam is 0.03 mm, power density Pd is $14 \times 10^5$ W/mm², the groove interval PL is 3 mm, the beam scanning speed V is in a range of 2500 mm/s to 50000 mm/s. In this manner, by forming grooves in the surface of the steel sheets at various beam scanning speeds V, steel sheets each having different groove depths were fabricated. In addition, here, attention is paid only to the relationship between the groove depth and the iron loss reduction effect and the height of a projection derived from melt in the periphery of the groove is not taken into account. Evaluation was performed by cutting a single sheet sample having a size in which a length in the rolling direction is 300 mm and a length in the width direction is 60 mm, from each of the steel sheets with the grooves formed therein and measuring iron loss Wg by an SST (Single Sheet Tester) method that is a well-known iron loss measuring method. Further, iron loss W0 of a grain-oriented electrical steel sheet in which a groove is not formed of the same material was also measured by this method. Here, the iron loss Wg and the iron loss W0 are iron loss values in excitation conditions in which a frequency is 50 Hz and the maximum magnetic flux density is 1.7 T. Comparative evaluation of the iron loss reduction effects was performed by calculating an iron loss reduction η% by the following equation (1) using the iron loss Wg and the iron loss W0.

$$\eta = (W0 - Wg)/W0 \times 100 \quad (1)$$

Figure 2:
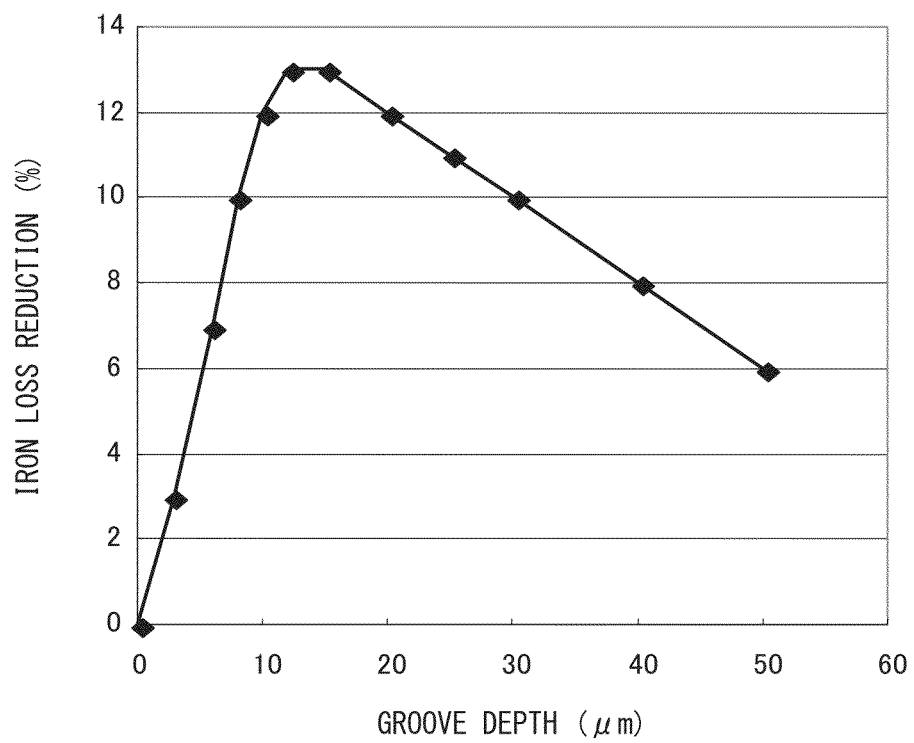
FIG. 2 is a diagram showing an example of the relationship between an iron loss reduction of a grain-oriented electrical steel sheet due to groove formation and a groove depth.

FIG. 2 is a diagram showing an example of the relationship between the measured depth of the groove of the surface of the steel sheet and the iron loss reduction η. Each steel sheet in which the depth of the groove was measured had the same quality of material and the sheet thickness thereof was 0.23 mm. As shown in FIG. 2, in a groove depth of 8 µm or more, the iron loss reduction effect significantly increases and the iron loss reduction η exceeding 10% (η>10%) is obtained. In a groove depth in a range of 10 µm to 30 µm, the iron loss reduction has the maximum value of about 13%. Further, if the groove depth exceeds 30 µm, the iron loss reduction η decreases to a value of less than 10%. If the groove becomes too deep, since the cross-sectional area (an area having high permeability) of the steel sheet at a portion which includes the groove becomes small, iron loss increases. Therefore, in terms of iron loss reduction, it is appropriate that the groove depth is in a range of 8 µm to 30 µm.

<Relationship Between Projection (Surface Projection) Derived from Melt and Transformer Characteristics>

Next, the effect of the projection (the surface projection) derived from melt on transformer characteristics was examined. Here, as the transformer characteristics, electric insulation between the laminated steel sheets was evaluated. This is because there is a need for electric insulation between adjacent layers (between the matrixes) to be maintained when the grain-oriented electrical steel sheets are laminated and compressed at the time of manufacturing of a transformer. Therefore, by pressing a plurality of contact electrodes against one side of a single sheet sample manufactured in the above-described laser beam irradiation conditions and then applying voltage thereto, an electric current flowing between the electrodes was measured. With respect to measurement conditions, an area per contact electrode is 1 cm$^2$, the voltage is 0.5 V, contact pressure is 230 psi (1.58 MPa), and the number of contact electrodes is 10. If an electric current flowing between the electrodes measured by this measurement method is equal to or less than 600 mA, in a common transformer centered on a small-scale transformer, favorable transformer characteristics are obtained. Further, in a large-scale transformer in which an interlayer voltage becomes relatively high, it is preferable that the electric current be equal to or less than 100 mA. In Table 1, a measurement example regarding the relationship between the height of the surface projection (an average projection height) and an electric current (an interlayer current) is shown.

TABLE 1

| | Average projection height (μm) | | | | | |
|---|---|---|---|---|---|---|
| | <1 | 2 | 3 | 5 | 10 | 20 |
| Interlayer current (mA) | 0 | 50 | 100 | 600 | 700 | 850 |

As shown in Table 1, if the height of the surface projection is reduced to 5 μm or less, the interlayer current can be reduced to 600 mA or less, so that the grain-oriented electrical steel sheet with the grooves formed therein can be preferably used in a common transformer iron core. Further, if the height of the surface projection is reduced to 3 μm or less, the interlayer current can be reduced to 100 mA or less, so that sufficient electric insulation is maintained between the layers. For this reason, the grain-oriented electrical steel sheet with the grooves formed therein can also be preferably used in various transformer iron cores in which high interlayer voltage may occur. In addition, if the height of the surface projection is reduced to 1 μm or less, almost complete insulation is obtained between the layers.

The above-described relationship between the height of the surface projection and the interlayer current is considered to be affected by the thickness (about 3 μm) of the insulating coating which is formed on the steel sheet surface in the final line of the grain-oriented electrical steel sheet. When manufacturing an iron core of a transformer, since the surface projection is present only in one of the steel sheet surfaces facing each other due to lamination, if the surface projection is equal to or less than a given size, it is possible to secure sufficient electric insulation by the insulating coating of the other steel sheet surface (the rear surface). Considering a condition such as a positional relationship between adjacent steel sheets or deformation of the surface projection, if the height of the surface projection is equal to or less than 5 interlayer electric insulation is sufficient. Further, if the height of the surface projection is equal to or less than 3 μm, interlayer electric insulation is excellent due to the effect of the thickness of the insulating coating.

<Method of Reducing Projection (Surface Projection) Derived from Melt which is Formed at Peripheral Portion of Groove>

On the basis of the above-described results of study, a method of reducing the projection which is derived from melt and is formed at a peripheral portion of the groove will be described below. The inventors performed laser beam irradiation on the grain-oriented electrical steel sheet at various power densities Pd and beam scanning speeds V and examined the correlation between the height of the surface projection, the groove depth, the power density Pd [W/mm$^2$], and the beam scanning speed V. Here, the laser beam intensity P was changed in a range of 200 W to 2000 W, the focused spot diameter (a focused beam diameter) d was changed in a range of 0.01 mm to 0.10 mm, and the beam scanning speed V was changed in a range of 5000 mm/s to 70000 mm/s, so that the power density Pd and the beam scanning speed V were controlled. Further, the cross-sectional surface of the formed groove was observed by an optical microscope and an SEM (Scanning Electron Microscope). Here, the power density Pd [W/mm$^2$] is defined by a focused beam area S [mm$^2$] in the following equation (2). Further, the focused beam area S [mm$^2$] is obtained from the following equation (3) using the focused beam diameter d. The focused beam diameter d is the diameter of a circular area in which energy of 86% of the total is included in a case of a circular laser beam having power intensity distribution on a cross-sectional surface perpendicular to a beam propagation direction. That is, in this case, energy which is included in a circular area of each radius (each diameter) in a laser beam is obtained by taking the integral of power intensity with respect to the radius of the laser beam toward the outside of the laser beam from the center of the laser beam. In addition, the height of the surface projection and the groove depth were measured by a commercially available contact type surface roughness meter.

$$Pd = P/S \quad (2)$$

$$S = \pi \times (d/2)^2 \quad (3)$$

Figure 3A:
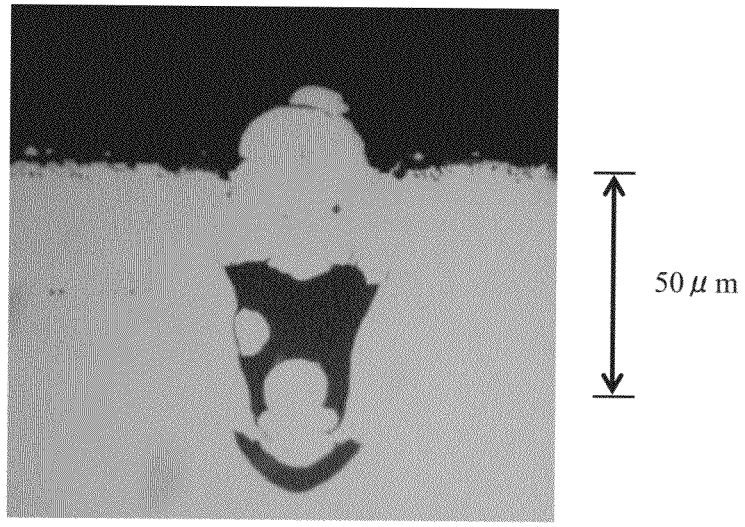
FIG. 3A is a cross-sectional image of a groove formed by laser beam irradiation with lower beam scanning speed and a peripheral portion of the groove.
Figure 3B:
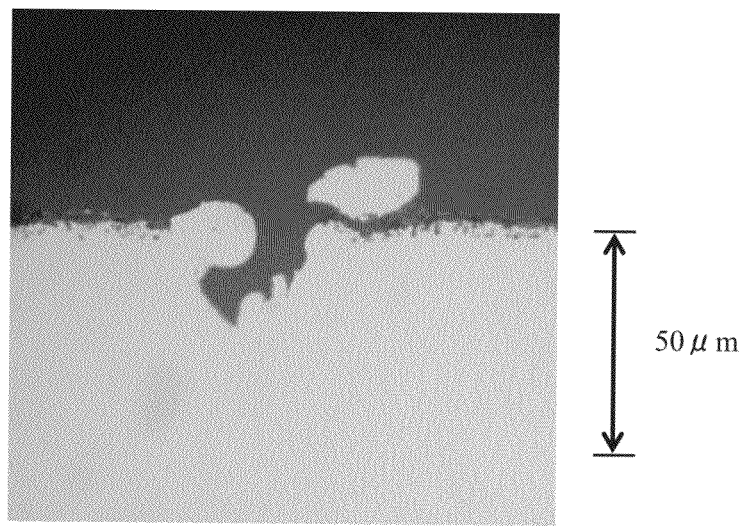
FIG. 3B is a cross-sectional image of a groove formed by laser beam irradiation with lower beam scanning speed and a peripheral portion of the groove.
Figure 3C:
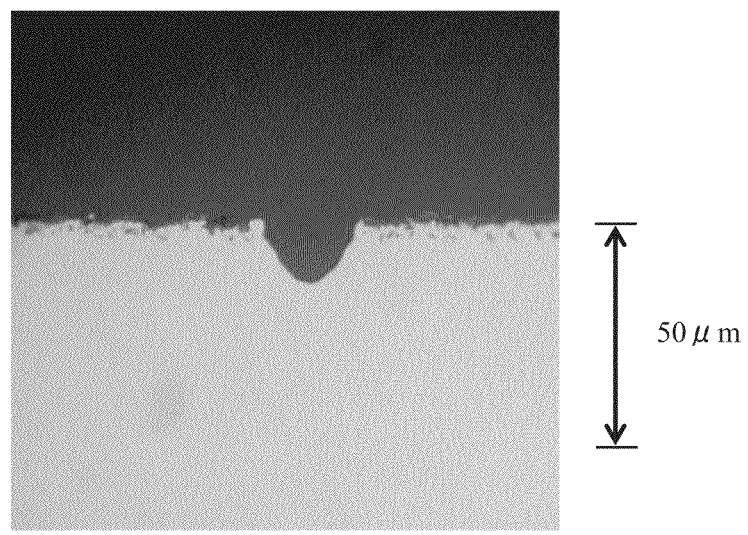
FIG. 3C is a cross-sectional image of a groove formed by laser beam irradiation with sufficient beam scanning speed and a peripheral portion of the groove.
Figure 4:
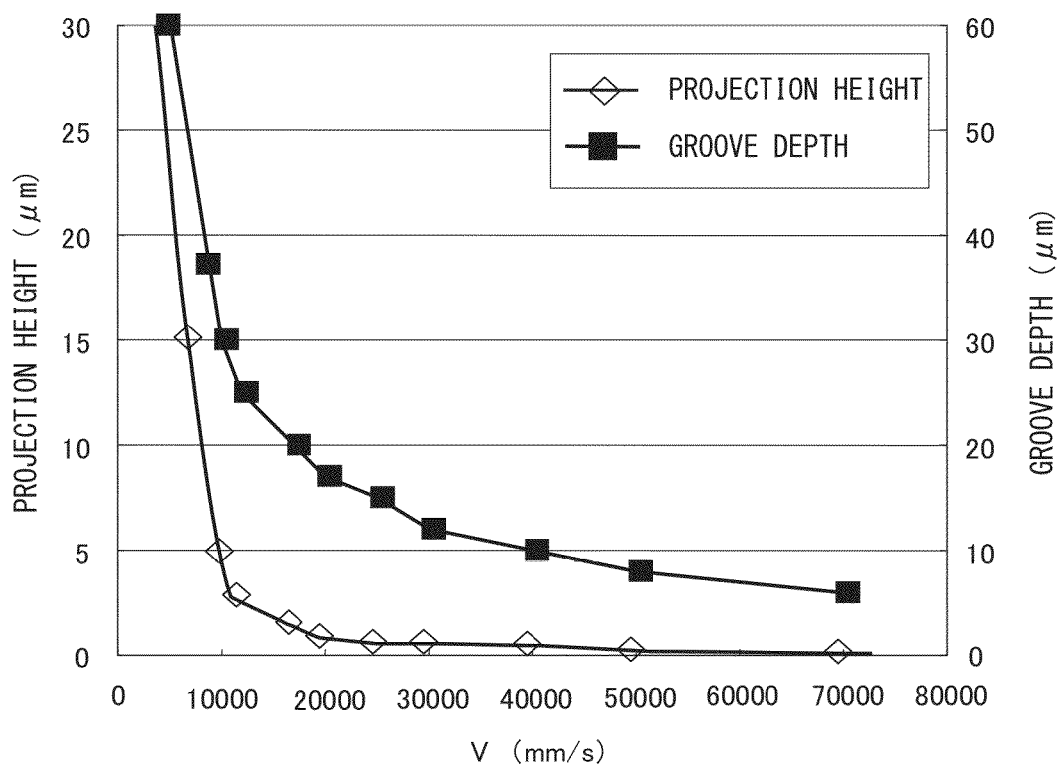
FIG. 4 is a diagram showing an example of the effect of beam scanning speed on the height of a projection derived from melt and a groove depth.

FIG. 4 is a diagram showing the effect of the beam scanning speed V on the average height of the projection (a projection height) derived from melt of a peripheral portion of the groove and an average groove depth (a groove depth) in the laser beam irradiation conditions in which the laser beam intensity P is 1000 W, the focused beam diameter d is 0.03 mm, and the power density Pd is 14.0×10$^5$ W/mm$^2$. Here, both the projection height and the groove depth are average values of 50 samples. FIGS. 3A to 3C are examples of cross-sectional images of the groove and the peripheral portion of the groove, as viewed from a groove direction (an extending direction of the groove).

First, the cross-sectional shape of the groove will be described using FIGS. 3A to 3C. FIG. 3A is a cross-sectional image of the groove when the beam scanning speed V is 5000 mm/s. In the beam scanning speed V that is such low speed, melting (a large amount of melt) of a depth (an amount) exceeding 60 μm is generated, so that a groove is formed temporarily. However, there is also a case where an upper portion of the groove is closed by a re-solidified material, so that a void is formed in the inside. In this case, the height of the surface projection is about 30 μm. FIG. 3B is a cross-sectional view of the groove when the beam scanning speed V is 10000 mm/s. From FIG. 3B, it can be seen that the groove depth decreases with increasing the beam scanning speed V. In FIG. 3B, the groove depth is about 30 μm. However, the height of the surface projection is equal to or more than 10 μm. FIG. 3C is a cross-sectional view of the groove when the beam scanning speed V is 30000 mm/s. In this speed, the groove depth is in a range of 10 μm to 15 μm, the projection height is equal to or less than 1 μm, and the surface projection almost disappears. In addition, the projection height may also be 0 μm. Here, at the peripheral portion of the groove, a re-solidified layer (described later) which is formed by solidification of a portion of a melt formed at a laser-irradiated portion was ascertained.

The relationship between the groove depth and the beam scanning speed V is shown by a closed square in FIG. 4. As shown in FIG. 4, if the beam scanning speed V exceeds 50000 mm/s, the groove depth becomes less than 8 μm. In this case, from FIG. 2, it can be seen that the iron loss reduction effect significantly decreases. Accordingly, when the power density Pd is $14.0 \times 10^5$ W/mm², an upper limit V2 of the beam scanning speed V necessary to sufficiently secure the groove depth is 50000 mm/s. In the case of obtaining the groove depth of 10 μm or more in order to obtain a higher iron loss reduction, it is preferable that an upper limit V2' of the beam scanning speed V be 40000 mm/s.

On the other hand, the relationship between the height of the projection derived from melt and the beam scanning speed V when the laser beam intensity P is 1000 W, the focused beam diameter d is 0.03 mm, and the power density Pd is $14.0 \times 10^5$ W/mm² is shown by a open rhombus in FIG. 4. As shown in FIG. 4, if the beam scanning speed V exceeds 10000 mm/s, the projection height can be controlled to be 5 μm or less. As shown in Table 1 (the measurement example regarding the relationship between the projection height and the interlayer current) described above, if the projection height is reduced to 5 μm or less, the interlayer current is reduced, so that sufficient transformer characteristics are obtained. Accordingly, a lower limit V1 of the beam scanning speed V necessary to make the projection height sufficiently small is 10000 mm/s. Further, if the beam scanning speed V exceeds 12000 mm/s, the projection height can be controlled to be 3 μm or less. In the projection height of 3 μm or less, as shown in Table 1, the interlayer current is small, so that favorable transformer characteristics are obtained. In this case, a lower limit V1' of the beam scanning speed V is 12000 mm/s. In addition, a lower limit V1" necessary to reduce the projection height to 1 μm or less, is 20000 mm/s, and in the beam scanning speed V in this range, better transformer characteristics can be expected. However, here, only with respect to a case where the power density Pd is $14.0 \times 10^5$ W/mm², the upper and lower limits (V1, V2, and so on) of the beam scanning speed V are determined. In addition, the lower limits V1, V1', and V1" of the beam scanning speed V are determined on the basis of the projection height and the upper limits V2 and V2' of the beam scanning speed V are determined on the basis of the groove depth.

The inventors carried out a laser irradiation experiment in various power densities Pd by various combination patterns of the focused beam diameter d in a range of 0.01 mm to 0.3 mm and the laser beam intensity P in a range of 100 W to 2000 W.

Figure 1:
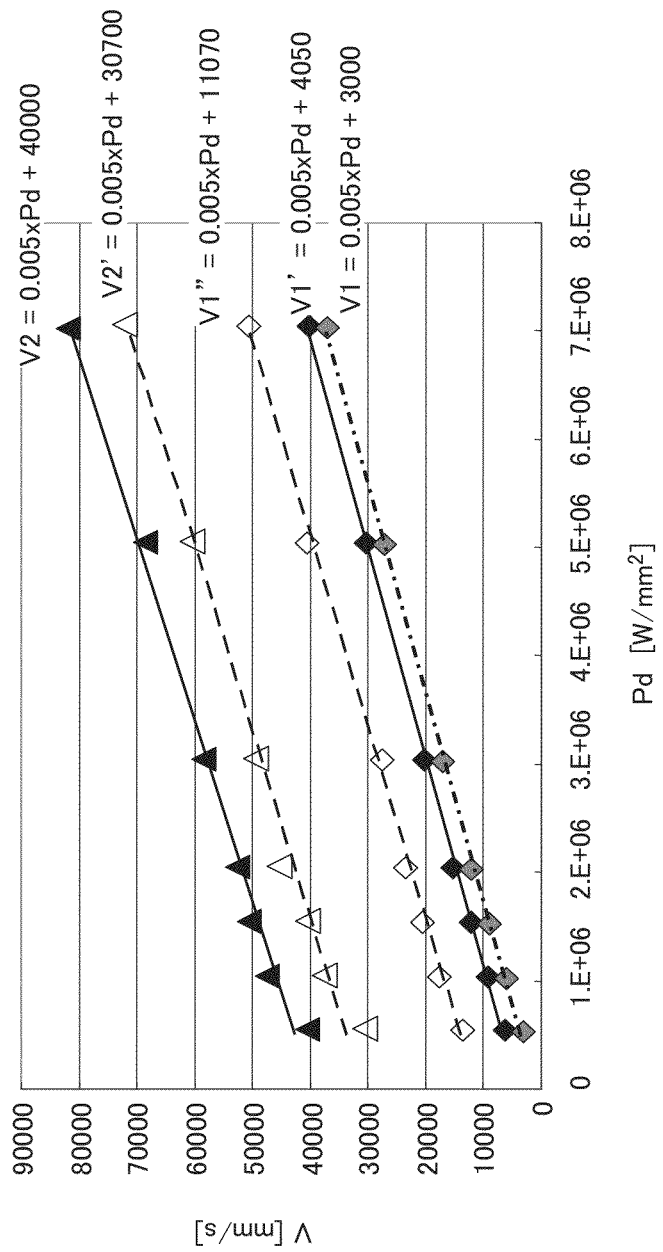
FIG. 1 is a diagram showing the relationship between power density of laser beam irradiation and the upper and lower limits of beam scanning speed.

In this irradiation experiment, the lower limit V1, the upper limit V2, the lower limit V1', the upper limit V2', and the lower limit V1" of the beam scanning speed V in each of the power densities Pd were examined. As a result, as shown in FIG. 1 (a diagram showing the relationship between the upper and lower limits of the beam scanning speed and the power density), in a case where the power density Pd is equal to or more than $5 \times 10^5$ W/mm², the upper and lower limits of the beam scanning speed V in which favorable iron loss characteristic and transformer characteristics are obtained were obtained. Further, it was found that the lower limit V1, the upper limit V2, the lower limit V1', the upper limit V2', and the lower limit V1" change approximately proportionately at a positive correlation with the power density Pd.

In addition, in the power density Pd of less than $5 \times 10^5$ W/mm², variations in the measured values became large in both the projection height and the groove depth, so that groove machining performance of the laser beam irradiation became unstable. In a low-speed machining region in which the beam scanning speed V is less than 5000 mm/s, heat conduction from a laser-irradiated portion to the periphery thereof becomes marked. Further, since the power density Pd is low, the amount of melt evaporating or scattering after melting decreases significantly. As a result, an area melting and re-solidifying in the surface of the steel sheet increases, so that the number and height of projections derived from melt increase. Further, since the melt remains in the laser-irradiated portion of the surface of the steel sheet, it is difficult for a groove to be formed and the groove depth also becomes unstable.

From FIG. 1, in a range in which the power density Pd is equal to or more than $5 \times 10^5$ W/mm², the relationship between the power density Pd and the upper and lower limits (the lower limit V1, the upper limit V2, the lower limit V1', the upper limit V2', and the lower limit V1") of the beam scanning speed V can be expressed by a linear approximation equation by a least-squares method. Optimum laser conditions to achieve both the projection reduction and the iron loss reduction can be simply determined by the linear approximation equation. That is, in FIG. 1, the lower limit V1 (V1=0.005×Pd+3000) represents the "value of the beam scanning speed V at which the projection height becomes 5 μm", the lower limit V1' (V1'=0.005×Pd+4050) represents the "value of the beam scanning speed V at which the projection height becomes 3 μm", and V1" (V1"=0.005×Pd+11070) represents the "value of the beam scanning speed V at which the projection height becomes 1 μm". Similarly, in FIG. 1, the upper limit V2 (V2=0.005×Pd+40000) represents the "value of the beam scanning speed V at which the groove depth becomes 8 μm", and the upper limit V2' (V2'=0.005×Pd+30700) represents the "value of the beam scanning speed V at which the groove depth becomes 10 μm". It is possible to appropriately control the beam scanning speed V by using the lower limit V1, the lower limit V1', the lower limit V1", the upper limit V2, and the upper limit V2' which are obtained by these linear equations. In order to obtain the transformer characteristics necessary for a common transformer by sufficiently reducing the iron loss, the beam scanning speed V is controlled so as to satisfy the following equation (4) (that is, V1≤V≤V2) depending on the value of the power density Pd. Further, in order to obtain better transformer characteristics by further reducing the iron loss by laser beam irradiation, it is preferable to control the beam scanning speed V so as to satisfy the following equation (5) (that is, V1'≤V≤V2) depending on the value of the power density Pd, and it is more preferable to control the beam scanning speed V so as to satisfy the following equation (6) (that is, V1"≤V≤V2').

$$0.005 \times Pd + 3000 \leq V \leq 0.005 \times Pd + 40000 \quad (4)$$

$$0.005 \times Pd + 4050 \leq V \leq 0.005 \times Pd + 40000 \quad (5)$$

$$0.005 \times Pd + 11070 \leq V \leq 0.005 \times Pd + 30700 \quad (6)$$

Here, as described above, the upper and lower limits (the lower limit V1, the upper limit V2, the lower limit V1', the upper limit V2', and the lower limit V1") of the beam scanning speed V can be determined depending on the power density Pd, and the power density Pd is defined by both the laser beam intensity P and the focused beam diameter d. Further, since the power density Pd and the beam scanning speed V affect supply energy to the laser-irradiated portion per unit time and unit area, they can also affect the cross-sectional area of the groove, which will be described later. In addition, if the power density Pd and the beam scanning speed V satisfy the equation (4), an upper limit of the power density Pd is not particularly limited. For example, the power density Pd may also be controlled to be equal to or more than $5 \times 10^5$ W/mm$^2$ and equal to or less than $7 \times 10^6$ W/mm$^2$.

Detailed Explanation of Effects of this Embodiment

Figure 6:
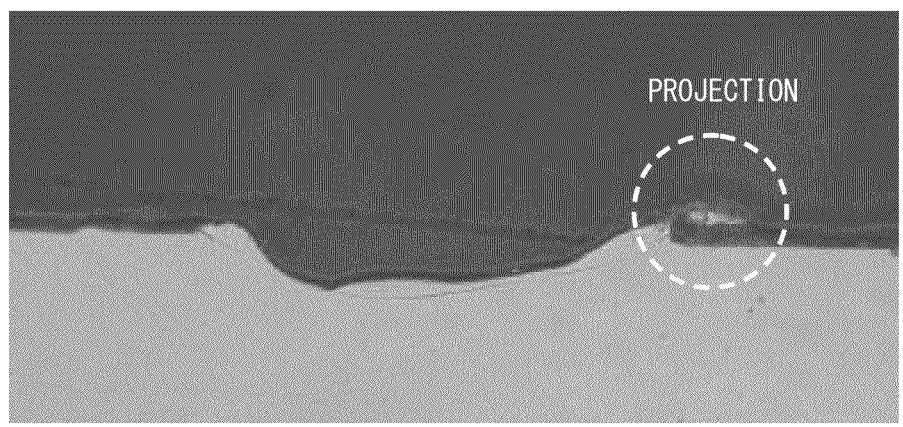
FIG. 6 is a cross-sectional image of a groove formed by laser beam irradiation using a $CO_2$ laser that is the conventional technique and a peripheral portion of the groove.
Figure 6:
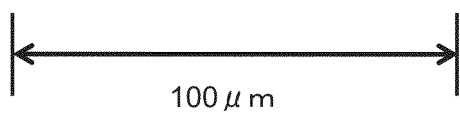

Next, description will be given regarding the mechanism of being able to machine a groove having a depth suitable for the iron loss characteristic while reducing a projection by high-speed laser scanning of a laser beam having high peak power density in this embodiment. In this embodiment, a continuous oscillation type laser (a laser capable of continuously oscillating) having a wavelength in a range of 1.0 μm to 2.1 μm and a high light-focusing property is used. For example, as such a laser, a fiber laser or a thin disk type solid-state laser which includes YAG is used. Laser light having this wavelength region is not easily absorbed by plasma of metal ions or metal vapor which is generated at a machining point. On the other hand, since a $CO_2$ laser having a wavelength in a band of 9 to 11 μm, which has been used in the past, is easily absorbed by plasma or metal vapor, power is consumed in a generation region of the plasma or the metal vapor, so that machining efficiency of a steel sheet surface is reduced. Further, since the plasma which has absorbed laser light becomes high temperature, thereby acting as a heat source which is spatially relatively large compared to the diameter of a focused beam, it unnecessarily melts the periphery of a groove, thereby forming a wide groove as shown in FIG. 6, so that a projection becomes large. Since such phenomena becomes more marked as power density becomes high, in a method using the $CO_2$ laser, it is disadvantageous to perform a high-speed treatment by raising power density and it is difficult to reduce a projection.

Further, by using the continuous-wave laser, there is also no deterioration of iron loss reduction due to the gap between holes of grooves of rows of points, which occurs in a pulse oscillation laser.

As the fiber laser, lasers in which the cores of fibers that are oscillation media are doped with various laser dopants (excited atoms) can be used. For example, in a fiber laser with a core doped with Yb (ytterbium), an oscillation wavelength is in a range of 1.07 μm to 1.08 μm, and in a fiber laser with a core doped with Er (erbium), an oscillation wavelength is 1.55 μm, and in a fiber laser with a core doped with Tm (thulium), an oscillation wavelength is in a range of 1.70 μm to 2.10 μm. Further, in a YAG laser that is a high-power laser having the same wavelength region, an oscillation wavelength is 1.06 μm. In methods using these fiber lasers and the YAG laser, since the effect of absorption of a laser to plasma or metal vapor at a machining point is small, these methods belong to the method related to the present invention.

Further, in this embodiment, if the diameter of the focused spot is controlled to be minimum focused light of 0.10 mm, the surface projection is reduced significantly. This is because a molten volume is reduced in addition to an increase in power density. Accordingly, it is preferable that the focused beam diameter be 0.10 mm or less. A high light-focusing property is required for a laser which is used. The fiber laser can focus light to the same extent as the diameter of the core, and in order to secure a higher light-focusing property, a fiber laser having a core diameter of 0.10 mm or less is appropriate. Further, in a thin disk laser in which an oscillation medium is a thin disk type crystal in a solid-state laser such as a YAG laser, since the surface area of the crystal is large, so that cooling is easy, even in a high-power operation, deterioration in light-focusing property due to heat strain of the crystal does not easily occur, and minute light-focusing of 0.10 mm or less can also be easily performed. Therefore, in the present invention, a thin disk solid-state laser is also appropriate. Here, a lower limit of the diameter of the focused spot is not particularly limited. However, it may also be, for example, 10 μm in consideration of the minimum core diameter of the fiber laser, the focal length of a lens, or the like.

In addition, the diameter of the focused spot and the groove width do not necessarily conform to each other. For example, if the power density is large and the beam scanning speed V is small, the groove width becomes larger than the diameter of the focused spot. Further, for example, if the power density is small and the beam scanning speed V is large, the groove width becomes smaller than the diameter of the focused spot. In addition, the groove width also changes according to power intensity distribution on the cross-sectional surface perpendicular to the beam propagation direction of a laser. Here, in a case where in the cross-sectional surface perpendicular to the width direction (a direction perpendicular to the transportation direction of the steel sheet) of the steel sheet, a laser beam non-irradiated area (a non-irradiated surface) is set on a reference surface (a reference height, the reference surface includes the surface of a coating before laser irradiation) in the sheet thickness direction, the groove (a groove portion) is an area where a portion of the steel sheet is removed from the reference surface by a laser beam. For this reason, the groove width (the width of the groove as a dimension) is defined as the maximum length of the groove in a direction perpendicular to the sheet thickness direction (the groove depth direction). In addition, with respect to various dimensions, a statistically sufficient number of measurements (for example, 30 measurements) are performed.

In addition, an embodiment of the grain-oriented electrical steel sheet according to the present invention will be described in detail using the drawings. In this embodiment, a groove having a given length and extending in a direction including a direction perpendicular to the transportation direction is formed in the surface of the grain-oriented electrical steel sheet by a heat source such as a laser. In the grain-oriented electrical steel sheet, a re-solidified layer derived from melt is formed between the groove and the matrix of the steel sheet (on the interface with the groove), the depth of the groove is in a range of 8 μm to 30 μm, and the cross-sectional area of the groove (a groove cross-sectional area) in the cross-sectional surface perpendicular to the width direction of the steel sheet is less than 1800 μm$^2$. Further, the groove formed in the steel sheet continuously extends in a direction (a beam scanning direction) intersecting the transportation direction of the steel sheet.

As described above, if the groove depth is in a range of 8 μm to 30 μm, the iron loss reduction η is improved up to 10% or more. Further, in terms of the iron loss reduction it is preferable that the groove depth be equal to or more than 10 μm. Similarly, it is preferable that the groove depth be equal to or less than 20 μm.

Figure 7:
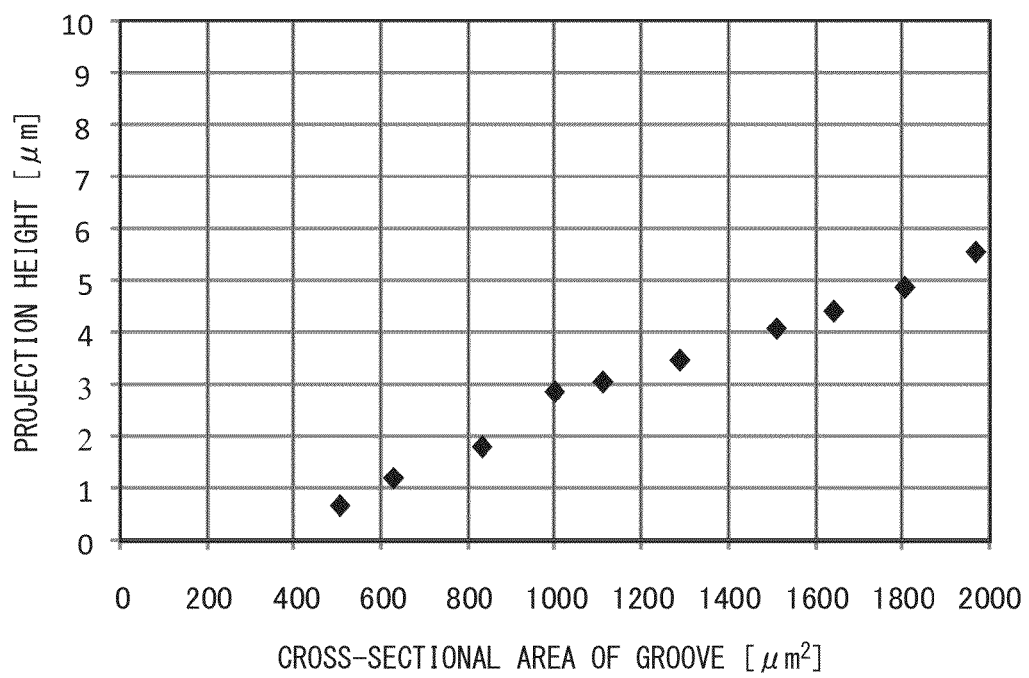
FIG. 7 is a diagram showing the relationship between a cross-sectional area of a groove and an average projection height.

Further, in the embodiment, the above-described projection height (the average projection height) is reduced to 5 μm or less. The projection height is affected by, for example, the amount of melt formed at the time of laser irradiation or a melt removal mechanism at the time of laser irradiation. Therefore, the inventors have studied in detail the relationship between the cross-sectional area of the groove resulting from melt formation and melt removal and the projection height. In FIG. 7, the relationship between the groove cross-sectional area and the average projection height is shown. As shown in FIG. 7, if the groove cross-sectional area is less than 1800 µm², the projection height can be reduced to 5 µm or less. Further, in order to reduce the projection height to 3 µm or less, it is preferable that the groove cross-sectional area be less than 1000 µm², and in order to make the projection height be 1 µm or less, it is preferable that the groove cross-sectional area be less than 600 µm². Here, the groove cross-sectional area is defined as an area in a case where the groove is approximated to a semi-ellipse in the cross-sectional surface perpendicular to the width direction of the steel sheet. That is, a groove cross-sectional area Ds [µm²] is defined by the following equation (7) using a groove width Dw and a groove depth Dd [µm].

$$Ds = \pi \times Dw \times Dd / 4 \qquad (7)$$

In this manner, by reducing the groove cross-sectional area, that is, the amount of the removed melt by making the focused beam diameter small, a material to form the projection is reduce, so that it is possible to lower the projection height.

In addition, a lower limit of the groove cross-sectional area is not particularly limited. However, it is preferable that the groove cross-sectional area be equal to or more than 50 µm in order to secure the groove depth of 8 µm or more and the groove width of 8 µm or more.

Further, in the embodiment, a solidified layer derived from melt is formed on the interface between the groove and the matrix of the steel sheet. The solidified layer derived from melt is formed by solidification of a portion of the melt formed in the laser-irradiated portion. For this reason, it is possible to ascertain the solidified layer derived from melt by corroding away the cross-sectional surface (a surface after cutting, resin filling, and polishing) perpendicular to the width direction of the steel sheet which includes the groove, using nital, and observing the cross-sectional surface. That is, it is possible to ascertain the clear boundary between a solidified portion (re-solidified layer) derived from melt and a portion (the matrix) which has not melted by observing a visualized clear grain boundary using, for example, an optical microscope.

As described above, it is preferable that the projection height be reduced to 5 µm or less, it is more preferable that it be reduced to 3 µm or less, and it is most preferable that it be reduced to 1 µm or less. The projection height may also be 0 µm or more. Further, the width of the groove may also be in a range of 0.01 µm to 50 µm. In addition, the sheet thickness of the grain-oriented electrical steel sheet may also be in a range of 0.10 mm to 0.50 mm. In the grain-oriented electrical steel sheet, particularly, the sheet thickness in a range of 0.17 mm to 0.36 mm is preferably used.

In addition, it is preferable that an electric current flowing between the layers of the laminated grain-oriented electrical steel sheets be equal to or less than 600 mV in a case where it is measured by the above-described method, and it is more preferable that it be equal to or less than 200 mV.

Further, a surface treatment may also be performed on the grain-oriented electrical steel sheet with the grooves formed therein, as necessary. For example, coating may also be performed on the surface of the grain-oriented electrical steel sheet with the grooves formed therein. Here, a definition of the groove in the embodiment is the same as that in the above-described embodiment and does not change even in a case where coating has been performed on the surface of the steel sheet after groove formation.

Further, in a case where the same results as measurement results which are obtained by a surface roughness meter are obtained, the groove depth (the depth of the groove) may also be determined from the length (a distance from the above-described reference surface to a leading end of the groove) of the groove in the sheet thickness direction. Similarly, the projection height may also be determined from a height (a distance in the sheet thickness direction) from the above-described reference surface to a leading end of the surface projection.

The preferred examples of the present invention have been described above. However, the present invention is not limited to these examples. Addition, omission, substitution, and other modifications of a configuration can be made without departing the scope of the present invention. The present invention is not to be considered as being limited by the foregoing description, and is only limited by the scope of the appended claims.

INDUSTRIAL APPLICABILITY

It is possible to provide a method for producing a grain-oriented electrical steel sheet, in which when forming a groove in the surface of the steel sheet by laser beam irradiation, the size of a surface projection which is formed at a peripheral portion of the groove is reduced as much as possible and which is suitable for a high-speed production line, and a grain-oriented electrical steel sheet having excellent iron loss characteristics.

REFERENCE SYMBOL LIST

1: Grain-oriented electrical steel sheet (steel sheet)
2: Laser device
3: Optical fiber (transmission fiber)
4: Laser irradiation device
5: Collimator
6: Polygon mirror (rotating polygon mirror)
7: fθ lens
LB: Laser beam
L: Rolling direction (transportation direction)
C: Sheet width direction
PL: Groove forming interval in rolling direction (transportation direction)

What is claimed is:

1. A grain-oriented electrical steel sheet in which grooves each having a given length and extending in a direction intersecting a transportation direction are formed at given intervals in the transportation direction by a laser beam, the grain-oriented electrical steel sheet comprising:
    a solidified layer provided on an interface with the groove; and
    a projection provided on a peripheral portion of the groove,
    wherein a depth of the groove is in a range of 8 µm to 30 µm, the cross-sectional area of the groove is less than 1000 µm², and
    a height of the projection is 5 µm or less,
    wherein the grain-oriented electrical steel sheet is prepared in a method comprising,
    forming grooves each having a given length and extending in a direction intersecting a transportation direction of the grain-oriented electrical steel sheet, at given intervals in the transportation direction by irradiating a surface of the grain-oriented electrical steel sheet with a laser beam while scanning the surface of the grain-oriented electrical steel sheet with the laser beam, wherein the laser beam is a continuous-wave laser beam having a laser wavelength λ of 1.0 μm to 2.1 μm, a power density Pd [W/mm$^2$] which is obtained by dividing a laser beam intensity P by a focused beam area S is 5×10$^5$ W/mm$^2$ or more, and the power density Pd [W/mm$^2$] and a scanning speed V [mm/s] of a focused spot of the laser beam on the surface of the grain-oriented electrical steel sheet satisfy a relationship of $0.005 \times Pd + 3000 \leq V \leq 0.005 \times Pd + 40000$.

2. The grain-oriented electrical steel sheet according to claim 1, wherein the depth of the groove is in a range of 10 μm to 30 μm.

3. The grain-oriented electrical steel sheet according to claim 2, wherein the cross-sectional area of the groove is less than 600 μm$^2$.

4. The grain-oriented electrical steel sheet according to claim 1, wherein the cross-sectional area of the groove is less than 600 μm$^2$.

5. A method for producing a grain-oriented electrical steel sheet in which grooves each having a given length and extending in a direction intersecting a transportation direction are formed at given intervals in the transportation direction by a laser beam, the grain-oriented electrical steel sheet comprising a solidified layer provided on an interface with the groove, and a projection provided on a peripheral portion of the groove, wherein a depth of the groove is in a range of 8 μm to 30 μm, the cross-sectional area of the groove is less than 1000 μm$^2$, and a height of the projection is 5 μm or less, the method comprising;

forming grooves each having said given length and extending in the direction intersecting the transportation direction of the grain-oriented electrical steel sheet, at given intervals in the transportation direction by irradiating a surface of the grain-oriented electrical steel sheet with the laser beam while scanning the surface of the grain-oriented electrical steel sheet with the laser beam, wherein the laser beam is a continuous-wave laser beam having a laser wavelength λ of 1.0 μm to 2.1 μm, a power density Pd [W/mm$^2$] which is obtained by dividing a laser beam intensity P by a focused beam area S is 5×10$^5$ W/mm$^2$ or more, and the power density Pd [W/mm$^2$] and a scanning speed V [mm/s] of a focused spot of the laser beam on the surface of the grain-oriented electrical steel sheet satisfy a relationship of $0.005 \times Pd + 3000 \leq V \leq 0.005 \times Pd + 40000$.

6. The method for producing a grain-oriented electrical steel sheet according to claim 5, wherein the laser beam is a fiber laser light or a thin disk type solid-state laser light including a YAG laser.

7. The method for producing a grain-oriented electrical steel sheet according to claim 6, wherein the power density Pd [W/mm$^2$] and the scanning speed V [mm/s] satisfy a relationship of $0.005 \times Pd + 4050 \leq V \leq 0.005 \times Pd + 40000$.

8. The method for producing a grain-oriented electrical steel sheet according to claim 6, wherein the power density Pd [W/mm$^2$] and the scanning speed V [mm/s] satisfy a relationship of $0.005 \times Pd + 11070 \leq V \leq 0.005 \times Pd + 30700$.

9. The method for producing a grain-oriented electrical steel sheet according to claim 6, wherein a diameter d of the focused spot is 0.10 mm or less.

10. The method for producing a grain-oriented electrical steel sheet according to claim 5, wherein the power density Pd [W/mm$^2$] and the scanning speed V [mm/s] satisfy a relationship of $0.005 \times Pd + 4050 \leq V \leq 0.005 \times Pd + 40000$.

11. The method for producing a grain-oriented electrical steel sheet according to claim 5, wherein the power density Pd [W/mm$^2$] and the scanning speed V [mm/s] satisfy a relationship of $0.005 \times Pd + 11070 \leq V \leq 0.005 \times Pd + 30700$.

12. The method for producing a grain-oriented electrical steel sheet according to claim 5, wherein a diameter d of the focused spot is 0.10 mm or less.

* * * * *